United States Patent [19]
Wang

[11] Patent Number: 5,805,646
[45] Date of Patent: Sep. 8, 1998

[54] SYNCHRONIZATION METHOD, AND ASSOCIATED CIRCUITRY, FOR IMPROVED SYNCHRONIZATION OF A RECEIVER WITH A TRANSMITTER USING EARLY-LATE TESTING DURING COARSE SYNCHRONIZATION

[75] Inventor: Eric Yi-Pin Wang, Cary, N.C.

[73] Assignee: Ericsson Inc., Research Triangle Park, N.C.

[21] Appl. No.: 727,370

[22] Filed: Oct. 8, 1996

[51] Int. Cl.$^6$ ........................................................ H04L 7/00
[52] U.S. Cl. ............................ 375/354; 375/365; 370/503
[58] Field of Search ........................................ 375/354, 365, 375/366, 367, 368; 370/503, 513, 510, 509, 520

[56] References Cited

U.S. PATENT DOCUMENTS

| | | | |
|---|---|---|---|
| 5,436,935 | 7/1995 | Berbhard et al. | 375/367 |
| 5,574,754 | 11/1996 | Kurihara et al. | 375/367 |
| 5,646,947 | 7/1997 | Cooper et al. | 370/510 |

*Primary Examiner*—Temesghen Ghebretinsae
*Attorney, Agent, or Firm*—Jenkens & Gilchrist

[57] ABSTRACT

A synchronization method and apparatus for synchronizing a receiver, such as a radiotelephone operable in a cellular communication system with a transmitter. A synchronization signal is transmitted within a multiframe of a control signal to the receiver, which upon powering up detects an undifferentiated digital bit stream and divides the bits into a succession of discrete portions or bins. Energy accumulations within each such portion are calculated, and a space-profile metric of those portions falling within a synchronization burst pattern computed. Space-profile metrics of adjacent portions are also computed. Taking the differences between a given portion and portions prior to and after the given portion, a difference metric is utilized to better predict the occurrence of a multiframe boundary, facilitating synchronization, despite the presence of other high-power bursts within the transmission.

30 Claims, 5 Drawing Sheets

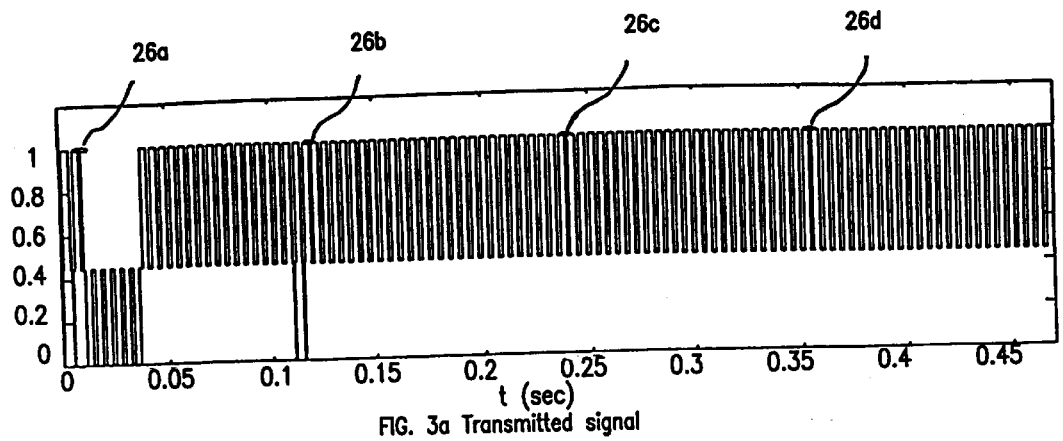
FIG. 3a Transmitted signal
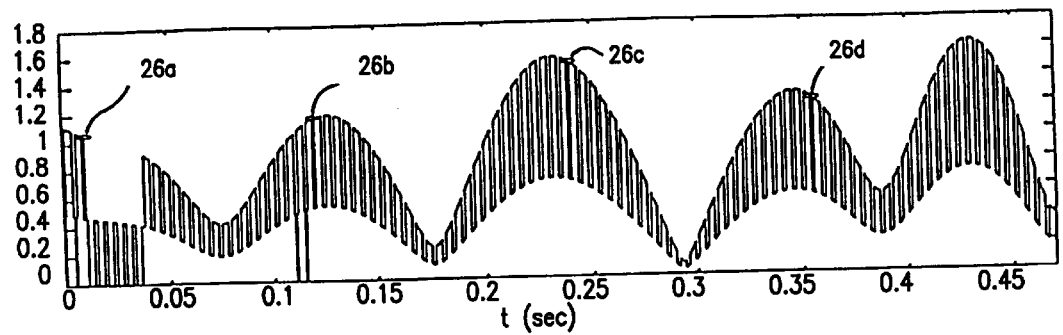
FIG. 3b Received signal in the absence of the additive white Gaussian noise
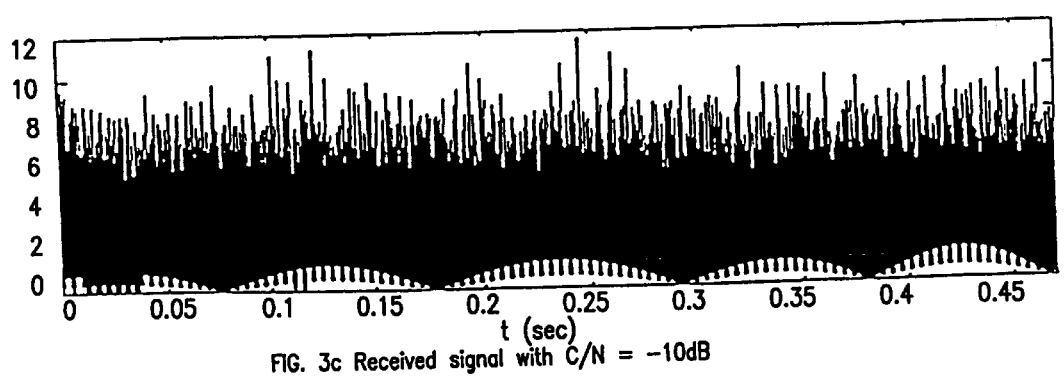
FIG. 3c Received signal with C/N = −10dB

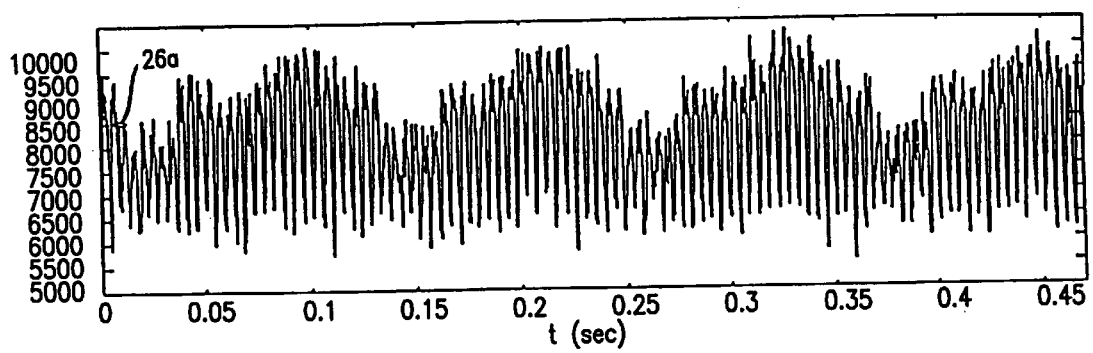
FIG. 4a Space profile test
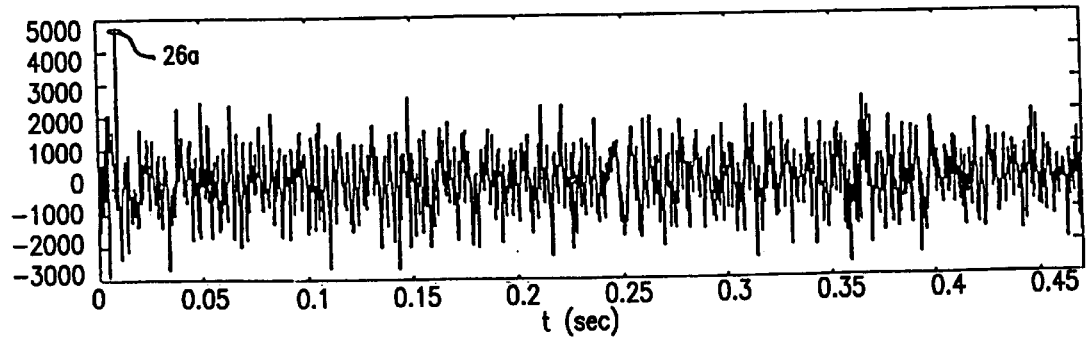
FIG. 4b Early-late test

SYNCHRONIZATION METHOD, AND ASSOCIATED CIRCUITRY, FOR IMPROVED SYNCHRONIZATION OF A RECEIVER WITH A TRANSMITTER USING EARLY-LATE TESTING DURING COARSE SYNCHRONIZATION

The present invention relates generally to synchronization methods and apparatus for synchronizing a receiver, such as a radiotelephone operable in a cellular communication system, with a transmitter which transmits signals to the receiver. Particularly, the present invention relates to a synchronization method, and associated circuitry, in which digitally-encoded synchronization signals are transmitted to the receiver and used by the receiver to synchronize the receiver with the transmitter. More particularly, the present invention relates to a synchronization method, and associated circuitry, in which synchronization attempted in the presence of other high-power non-synchronization bursts is improved or made possible through use of early-late testing.

The synchronization signals are of characteristics which permit their detection by the receiver through a correlation process of reduced complexity. Synchronization of the receiver is effectuated quickly as only a reduced number of calculations is required to detect the synchronization signals.

The synchronization signals are of high margin to facilitate their detection by the receiver even when the signals are transmitted upon a communication channel subjected to high levels of attenuation or multi-path distortion. Because the synchronization signals are digitally-encoded, signals can be transmitted in a time division multiplex (TDM) communication scheme, such as those used in several, conventional, cellular communication systems. The present invention is, therefore, advantageously embodied in a cellular communication system, such as a terrestrial-cellular communication system or a satellite-cellular communication system. When transmitted during selected time slots to form portions of a control signal generated on control channels by a cellular network station to a radiotelephone, and the radiotelephone, responsive to the detection of the synchronization signals, becomes synchronized to the transmitter, both to receive other portions of the control signal and other signals generated upon other data or voice channels.

BACKGROUND OF THE INVENTION

A communication system is formed, at a minimum, by a transmitter and a receiver interconnected by a communication channel. Communication signals transmitted by the transmitter are transmitted upon the communication channel to be received by the receiver.

A radio communication system is a communication system in which the communication channel is formed of one or more frequency bands of the electromagnetic frequency spectrum. Because a fixed or hard-wired connection is not required to be formed between the transmitter and the receiver, a radio communication system is advantageously utilized when the use of such fixed or hard-wired connections would be inconvenient or impractical.

A cellular communication system is a type of radio communication system. When the infrastructure, hereinafter referred to as the network, of the cellular communication system is installed throughout a geographical area, a subscriber to the cellular system is generally able to communicate telephonically in the system when positioned at any location in the geographical area encompassed by the system.

While conventional, terrestrial-cellular communication networks have been installed throughout significant portions of the world, some areas are without such networks. In areas of low population density, for instance, a terrestrial-cellular communication network might not be commercially viable. Also, existing terrestrial-cellular networks have also been constructed pursuant to various different standards.

A radiotelephone, i.e., a hand-held or cellular telephone, operable in one of the communication systems is sometimes not operable in other such systems. Even in an area in which a cellular communication network has been installed, a user might not be able to communicate pursuant thereto if the user attempts to utilize a radiotelephone constructed to be operable only with another one of the cellular communication networks.

Satellite-cellular communication systems, such as the Association of SouthEast Asian Nations' (ASEAN) Cellular Satellite (ACeS) system which is designed to provide telephone coverage by use of a geostationary satellite, have been proposed which, when implemented, shall permit a user to communicate telephonically by way of the satellite-cellular communication system when positioned at almost any location. By transmitting down-link signals between a satellite-based transceiver and the radiotelephone and up-link signals between the radiotelephone and the satellite-based transceiver, telephonic communication shall be possible between the radiotelephone and the satellite-based transceiver. By effectuating additional communication links between the satellite-based transceiver and a ground station, the user of the radiotelephone shall be able to communicate telephonically with another party by way of the ground station and the satellite-based transceiver.

Because of the inherent efficiencies of digital communication techniques, many already-installed cellular communication networks have been converted, and many newly-proposed cellular communication systems, such as the ACeS system, are being designed, to utilize digital communication techniques. Other communication systems similarly utilize, or are planned to be converted to or to utilize, digital communication techniques.

To function properly, particularly when the communication system utilizes digital communication techniques, the radiotelephone must be synchronized with a network station of the cellular communication network. Conventionally, synchronization signals are transmitted by the network station to the radiotelephone to synchronize the radiotelephone with the network station. Other communication systems similarly utilize conventional, synchronization signals for similar purposes.

In a TDM communication system, such as a time division multiple access (TDMA) system, communication is effectuated by the use of frames. In TDMA, a given frequency band is divided into a series of discrete frames each having a series of discrete timeslots therein, each timeslot for use by a different subscriber. Although many systems utilize eight timeslots per frame, ACeS provides for multiple users per time slot, effectively becoming a 16- or 32-slot system. During each timeslot, information may be transmitted in burst form in accordance with a particular digital bit configuration. A normal burst is the transfer of speech or data information. Other burst types include high power synchronization bursts, groups of which form the aforementioned synchronization signals, which are preferably unevenly spaced across many frames within a multiframe, i.e., 102 consecutive frames in the ACeS system. The initial high-power synchronization burst in such a signal, however, is placed at the start of the first frame in a multiframe, signaling the multiframe boundary, and the remaining synchronization bursts, usually three, which could constitute high-power broadcast bursts, are unevenly spaced from the initial sync burst within the multiframe by known offsets.

It is readily apparent, however, that a radiotelephone or cellular phone, upon initial power up, is not synchronized with the digital bit stream emanating from the transmitter and must ascertain the multiframe boundary, i.e., the start of the initial synchronization burst, within that bit stream. Once the first sync burst and the multiframe boundary are found, the receiver may then quickly get in sync with the transmission. However, many multiframes of the transmission may transpire and a significant number of processing steps performed before synchronization is achieved even without the presence of interfering signals.

Conventionally, two types of synchronization are performed: coarse and fine. Coarse synchronization is designed to narrow the bit stream selection to a particular portion of consecutive bits hopefully containing the initial high-power sync burst, i.e., the multiframe boundary. Fine synchronization then determines the exact location of the initial sync burst within that portion by correlating or matching a segment of the selected consecutive bits to a bit pattern, and shifting the segment bit by bit until correlation and synchronization are achieved. The focus of the present invention, however, is to achieve faster coarse synchronization.

In addition to synchronization bursts, other high-power bursts are present in the digital bit stream which could interfere with the coarse synchronization procedure. For example, high-power paging bursts may be present, particularly in an ACeS environment, to contact difficult-to-reach subscribers. The presence of these other high-powered, non-synchronization bursts in the bit stream complicates sync acquisition.

Any manner to achieve synchronization, despite the presence of these other non-synchronization high-power bursts in the transmitted bit stream, requiring a lesser number of processing steps and time would be advantageous.

One technique for the synchronization of a receiver with a transmitter, such as a mobile or hand-held phone of a cellular communication system, which reduces the number of processing steps, is the use of a power profile method during coarse synchronization, as will be discussed more fully later. In particular, the power profile technique calculates the energy accumulated in each of a plurality of bins, i.e., subunits of a timeslot, and, through use of a priori knowledge about the spacings between high-power synchronization bursts, combines the energy accumulated in the bins to ascertain the correct multiframe boundary and thereby facilitate synchronization. At a signal to noise (C/N) ratio equal to −10 dB, e.g., noise variance is ten times signal strength, it has been found that a phone can acquire coarse synchronization within 10 multiframes using the aforedescribed power profile method. Accordingly, the time required to achieve synchronization is about 4.7 seconds (10×0.47 seconds per ACeS multiframe).

A problem with the aforementioned power profile method, however, is that it may be unable to achieve synchronization at all while other non-synchronization bursts having the same power level are transmitted on the same carrier. For example, in the ACeS satellite system channel power is limited and it may be difficult to page a subscriber using normal power. Thus, high-power paging capability may frequently be necessary, and when all the high-power bursts are on the same carrier, problems arise.

The difficulty is that the receiver cannot distinguish between high-power synchronization (HPS) bursts and high-power paging or broadcast bursts. The receiver, using the aforedescribed power metric, gets confused, cannot identify the multiframe boundary and, therefore, cannot synchronize.

In one solution to this problem, different carriers are used to allow the radiotelephone to acquire synchronization on one carrier and get high-power control channel messages on the other carrier. This, however, would require the radiotelephone to switch frequencies during sleep mode operation. Furthermore, for a transmission beam covering a light traffic area, it is likely that only one carrier would be available to that area. In such a case, the aforedescribed power profile method would not work since all control channels have to be on the same carrier.

It is, accordingly, an object of the present invention to provide a technique for improved synchronization performance at low signal-to-noise ratios, by which coarse synchronization is achieved despite the coexistence of numerous other high-power bursts on the same control channel carrier.

It is a more particular object of the present invention to ascertain the starting sequence of a high-power synchronization burst with improved accuracy.

It is a further object of the present invention to accomplish the aforesaid improved coarse synchronization by use of early-late tests, more particularly, by comparing portions of the received signal to previous and later portions of the received signal to better identify the multiframe boundary.

SUMMARY OF THE INVENTION

The present invention advantageously provides an improved synchronization method, and associated circuitry, for achieving coarse synchronization of a transmitter with a receiver, such as a radiotelephone operable in a cellular communication system.

The digitally-encoded synchronization signals are transmitted in a spaced pattern across a transmission multiframe, the first portion of which contains the start of the synchronization signal. The receiver synchronizes itself to these signals through the use of early-late tests, by which synchronization is possible despite the presence of non-synchronization high-power bursts from other control channels. In particular, an energy metric for a candidate synchronization start signal is obtained and compared with the energy metrics of related displaced previous (early) and subsequent (late) portions of the transmission signal to ascertain whether the candidate signal is indeed the synchronization signal start, marking the multiframe boundary.

The circuitry and its associated synchronization method of the present invention are advantageously utilized in a cellular communication system to synchronize radiotelephones operable therein to a network station. In a terrestrial-cellular communication system, the synchronizing signals are transmitted to the radiotelephone as portions of a control signal generated at a cellular base station. In a satellite-cellular communication system, the synchronizing signals form portions of a control signal generated at a network control center and are transmitted to the radiotelephone by way of a satellite-based transceiver. In both instances the receiving apparatus utilize the early-late testing metrics of the present invention to improve synchronization accuracy, thereby reducing the time necessary for synchronization.

In these and other aspects, therefore, a method, and associated circuitry, synchronizes a receiver with a transmitter. The receiver and the transmitter are coupled together by way of a communication channel. A control signal is transmitted from the transmitter upon the communication channel. The control signal is formatted pursuant to a multiframe format and includes synchronization signals therein. The digital bit stream constituting the control signal is detected at the receiver, and a portion thereof analyzed by computing the energy accumulated therein. The aforementioned early-late tests are then computed to ascertain whether the portion is truly the start of the synchronization signal, i.e., a multiframe boundary. If found to be the synchronization start signal, the synchronization signal and multiframe boundary are used to synchronize the receiver with the transmitter and the control signal transmitted therefrom.

A more complete appreciation of the present invention and the scope thereof can be obtained from the accompanying drawings which are briefly summarized below, the following detailed description of the presently-preferred embodiments of the invention, and the appended claims.

BRIEF DESCRIPTION OF THE DRAWINGS

FIG. 3A is a graph illustrating a sequence of power levels for transmitted control signals in a portion of a control channel multiframe;

FIG. 3B is a graph of the power level signal of FIG. 3A as received and in the absence of additive white Gaussian noise;

FIG. 3C is a graph of the power level signals of FIGS. 3A and 3B as received;

FIG. 4A is a graph of space profile metric values for the power level signals of FIGS. 3A–3C;

FIG. 4B is a graph of early-late metric values based upon the space profile metric values of FIG. 4A.

DETAILED DESCRIPTION OF THE PRESENT INVENTION

Figure 1:
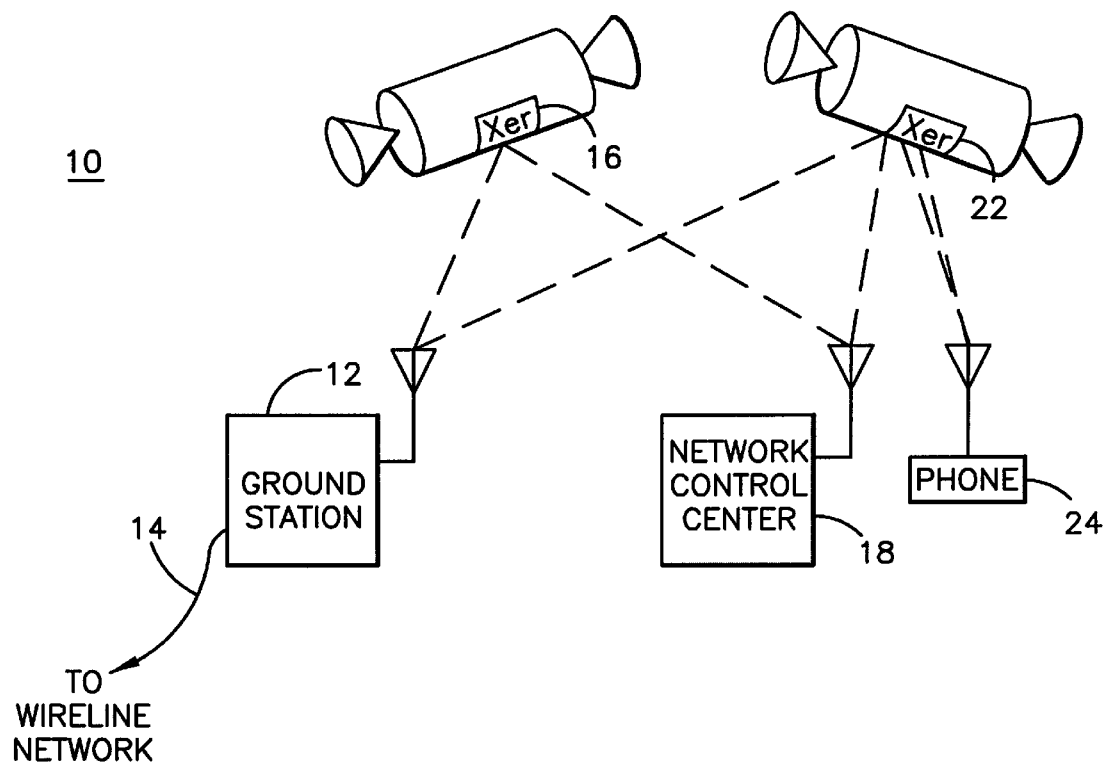
FIG. 1 illustrates a functional block diagram of a satellite-cellular communication system which embodies the circuitry and method of an embodiment of the present invention.

Referring first to FIG. 1, a satellite-cellular communication system, shown generally at 10, includes the circuitry, and carries out the methodology, of an embodiment of the present invention. While the communication system 10 of the illustrated embodiment forms a satellite-cellular communication system, it should be understood at the outset that the circuitry and methodology of the present invention can analogously be embodied in other types of communication systems, including, for instance, a terrestrial-cellular communication system or other type of radiotelephonic communication system.

The communication system 10 includes a ground station 12 coupled to a wireline telephonic network. Such coupling is represented in the figure by the lines 14 extending from the ground station 12.

The ground station 12 includes transceiver circuitry for transceiving communication signals, inter alia, with a satellite-based transceiver 16. The satellite-based transceiver is operable to transceive communication signals not only with the ground station 12 but also with other land-based devices, such as the transceiver circuitry of a network control center 18. The transceiver 16 is here operable primarily as a relay station for relaying signals generated at the ground station 12 to the network control center 18 and vice-versa. The transceiver 16 preferably further includes control circuitry permitting the frequency channels upon which the signals transmitted to the transceiver 16, to be relayed therefrom, to be altered to most efficiently utilize the frequency channels allocated for communication in the communication system 10.

Transceiver circuitry of the network control center 18, in turn, is able to transceive communication signals with other satellite-based transceivers, such as a transceiver 22. The transceiver 22, similar to the transceiver 16 transceives communication signals with land-based transceivers including, for example, a hand-held telephone or cellular 24. Again, the transceiver 22 is primarily operable to relay communication signals transmitted thereto, and again preferably includes control circuitry for selecting the frequency channels upon which signals transmitted thereto are relayed to other communication stations.

Communication pursuant to the communication system 10 permits a user of a hand-held telephone, to communicate telephonically when positioned at any location throughout large areas of the world. As long as the user of the radiotelephone 24 is positioned to permit transmission and reception of communication signals with a satellite-based transceiver, the user is able to communicate telephonically with a user of another radiotelephone or to a telephonic device of a conventional, wireline network.

To operate properly, however, the radiotelephone 24 must be synchronized with the cellular network. Once properly synchronized, voice or other communications can be effectuated between the radiotelephone and the cellular network.

Coarse synchronization between a receiver, such as the radiotelephone 24, and a transmitting station, such as the cellular network, may be achieved using a linear power profile method. According to this method, a summation of discrete power samples within a plurality of bins making up a synchronization pattern is made, and through analysis of the spacings between the high-power synchronization bursts, the boundaries between the transmission multiframes are ascertained and synchronization achieved.

A satellite communication system, of which the communication system 10 of the present invention is exemplary, is, like that described in the related application, Ser. No. 08/728,179, filed Oct. 9, 1996, entitled "Synchronization Method, and Associated Circuitry, for Improved Synchronization of a Receiver with a Transmitter Using Nonlinear Transformation Metrics", a communication system in which power signals are transmitted between the satellite of the communication system and the radiotelephone 24. Therefore, a signal to noise power ratio, C/N, is typically of a relatively low value. If an antenna at the radiotelephone is not oriented to detect the best signals transmitted thereto, the signal to noise ratio of signals actually received by the radiotelephone are even further reduced. In the proposed ACeS, satellite-cellular communication system, paging signals are required to be transmitted at a margin of thirty decibels over average white Gaussian noise (AWGN). Such a requirement corresponds, generally, in a radiotelephone of sensitivity to detect a paging signal having a C/N ratio of about minus ten decibels. As a radiotelephone must be synchronized with the cellular network to properly receive the paging signal, the communication system requires a high margin synchronization capability to allow synchronization in the presence of these other, high-power, non-synchronization signals.

High-power synchronization (HPS) bursts transmitted to a radiotelephone permit the radiotelephone to become synchronized with the network. In a preferred embodiment of the present invention, synchronization is generally a two-step process. Coarse synchronization is first effectuated; thereafter, fine synchronization is effectuated. During coarse synchronization, one or more HPS bursts during each multiframe permit synchronization of the radiotelephone to a first level of synchronization. And, during the subsequent fine synchronization, acquisition to within a single symbol bit is possible; also, more precise frequency offset is provided. The subject matter of the present invention is concerned primarily, albeit not exclusively, with achieving coarse synchronization quickly and accurately, and despite the presence of unrelated high-power bursts within the multiframes.

When the radiotelephone 24 is turned on, the device begins a coarse synchronization procedure. The coarse synchronization process reduces the time (and frequency) uncertainty to a selected level which in turn reduces the number of operations required to perform fine synchronization. In one embodiment, the radiotelephone searches all possible primary carriers when the radiotelephone is turned on. A primary carrier is the carrier which multiplexes the control channels. In another embodiment, the radiotelephone is assumed to have pre-registered in a region using the nominal control channels prior to receiving paging signals.

In either embodiment, system synchronization is effectuated by utilizing high-power synchronization (HPS) bursts which include predetermined patterns of synchronization bursts within each multiframe of the transmission. The bursts are time-multiplexed with other control channels and traffic channels, such as the high-powered broadcast signals on the broadcast control channel (BCCH), a paging channel or other transmission channels.

Although the power profile method set forth in the related application effectuate coarse synchronization rather quickly and at high margin to facilitate detection, the present invention is directed to further improvements in this art, whereby synchronization is achievable despite the problem of the presence of these other interfering high-power bursts.

In a proposed air-interface specification for ACeS, each multiframe in the transmission has four high-power, unevenly spaced synchronization bursts (HPS) which are used for the initial coarse synchronization, the initial synchronization burst occurring at the multiframe boundary. As noted, however, each multiframe in the ACeS system also must provide other high-power bursts on the same carrier, e.g., high-power paging bursts (HPA) for alerting users in those areas with poor channel conditions. The problem arises in putting all of these high-power bursts, i.e., HPA and others, on the same carrier with the HPS bursts and expecting a given radiotelephone 24 to achieve coarse synchronization from the HPS bursts alone without confusion from the various other high-power also bursts present on the carrier. It should be understood, however, that the synchronization bursts within each multiframe may include both HPS and high-power broadcast bursts or HPB bursts on the broadcast channel (BCCH), e.g., an HPS burst to mark the multiframe boundary and three HPB bursts, acting as HPS bursts, dispersed within the multiframe.

The present invention seeks to solve this problem by use of an early-late test algorithm or metric which analyzes the spacing profiles of the detected high-power bursts to determine the start of the synchronization, which in turn, determines the start of a multiframe, which in turn orients the receiver to the transmitter. A particular portion of the detected bit stream constituting the control signal, such as a bin, is selected as a hypothetical starting point, i.e., the multiframe boundary, and the energies therein (and in the other bins within the respective timeslot) accumulated. The energies of those bins (and timeslots) spaced from the hypothetical bin in accordance with the known, uneven, spacing pattern for the synchronization bursts, spread across the multiframe, are also accumulated. Even though the accumulated energy may be large, indicating high-power bursts within each of the bins and timeslots in question, the selected portion may still not be at the start of a multiframe since the aforementioned other high-power bursts could closely mimic the synchronization pattern.

To ensure that the selected portion is indeed at the multiframe boundary, similar energy accumulations or summations are performed on other portions of the control signal. In particular, the same energy accumulation is performed, in accordance with the synchronization burst spacing pattern, on bins spaced a given distance on either side of the selected portion, and the energy accumulations compared. By use of this early-late testing, described in more detail below, coarse synchronization is achieved with improved accuracy and fewer false detections. Furthermore, synchronization is improved despite the co-existence of other high-power bursts on the HPA channel and whether the HPA channel is heavily or lightly loaded.

The early-late testing method of the present invention, allowing synchronization in the presence of these other high-power bursts on the same channel carrier, relies upon the idea that these other high-power bursts adhere to the principle of contiguity, i.e., the non-synchronization burst signals will be spaced apart in an even manner across the transmission stream of the control signal in accordance with the structure of bursts within a timeslot, frame and multiframe of a transmission signal. For example, one or more high-power paging signals, regularly repeating across a particular timeslot, may happen to mimic the synchronization burst spacing and an incorrect synchronization selection is made.

If these other bursts are contiguous, they will each bridge numerous consecutive frames within a given timeslot, e.g., slot i of frames j, j+P, j+2P, . . . , j+(N−1)P, where N represents the number of bursts or frames in the given message, and P represents the spacing between the bursts, i.e., the number of timeslots apart for each discrete burst, which in ACeS may be 2 or 4 due to multiple users.

Figure 2:
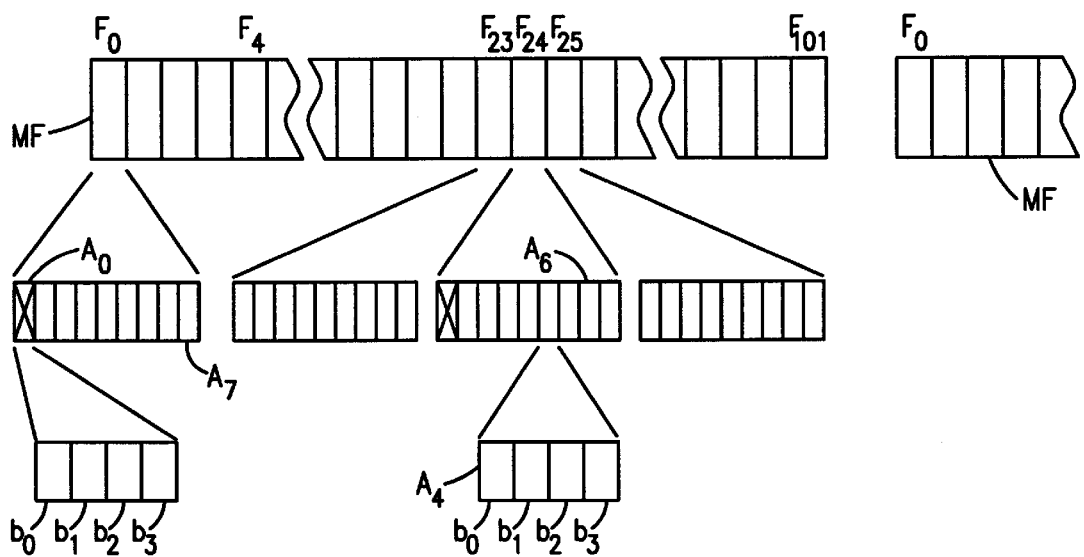
FIG. 2 is a block diagram illustrating components of a control channel multiframe.

Shown in FIG. 2 is a diagram of a multiframe MF, frames $F_0$, $F_{23}$, $F_{24}$ and $F_{25}$ within which are shown in more detail. Timeslots $A_o$, $A_1$, . . . $A_7$ within each frame F are also shown along with an expanded view of some of the timeslots showing four bins $b_o$, $b_1$, $b_2$ and $b_3$ therein, each bin containing a plurality of signal bits therein. According to the aforedescribed principle of contiguity, if a high-power paging burst is found in a given slot, e.g., $A_6$ in frame $F_{24}$, more particularly within bins $b_o$–$b_3$ of that timeslot, then other bursts related to the burst in timeslot $A_6$ may be found in the corresponding timeslot location in other related contiguous frames, e.g., slot $A_6$ in neighboring frames $F_{23}$ and $F_{25}$, respectively transmitted just prior to and after frame $F_{24}$. For example, if a paging message (HPA) is transmitted on timeslot $A_6$ of frame $F_{24}$ then the contiguous frames $F_{23}$ and $F_{25}$ may also contain other portions of the paging message. If frame $F_{24}$, timeslot $A_6$ is the start of the paging message, then the corresponding timeslot in frame $F_{25}$ would most likely contain a subsequent portion of the page.

Synchronization bursts (HPS), however, are preferably spread unevenly throughout the multiframe MF in accordance with a particular pattern and on non-contiguous frames, preferably on the same timeslots within those frames. It should be understood, however, that the HPS may be on different timeslots within the respective frames. In either event, the respective synchronization burst pattern preferably does not adhere to the principle of contiguity.

It should be understood, however, that the digital bit stream of control signal information detected by the receiver is an undifferentiated stream of bits, groups of which (equivalent to a bin) are selected, preferably in seriatim, for analysis. In particular, the energy accumulated in each of the respective selected portions (or bins) is computed. For example, with $r_i$ representing the received signal sample for a given portion or bin l, the energy accumulated in that given bin l ($B_l$) is calculated by the formula:

$$B_l = \sum_{i=x}^{y} |r_i|^2 \quad (1)$$

where the summation is over the received signal sample of the given bin l over the respective bits therein, i.e., from the initial bit starting bin l, at x, to the ending bin bit, at y. Accordingly, $B_o, B_1, \ldots B_{L-1}$ represent the bin metrics or energies associated with bins 0, 1, ... and L−1, respectively, where L represents the total number of bins in the multiframe MF. In the multiframe MF shown in FIG. 2, L=3,264 (102 frames/multiframe×8 slots/frame×4 bins/slot). As noted, the hypothetical starting bin i, i.e., the first bin of the first high-power synchronization burst, e.g., bin $b_o$ in frame $F_0$, timeslot $A_0$ as shown in FIG. 2 is a correct choice for the starting synchronization burst marking the multiframe boundary.

Alternatively, the energy accumulated in the given bin l ($B_l$) may be calculated by the formula:

$$B_l = \int_{x}^{y} |r(t)|^2 dt \quad (2)$$

where the integration is over the time interval of bin l, i.e., from bit x to bit y therein, and where r is a function for the received signal sample over time over said interval.

In accordance with the preferred embodiment of the present invention, a space-profile metric (M) for the selected bin i is calculated using the formula:

$$M_i = \sum_{n=0}^{N-1} \sum_{j=0}^{K-1} B_{(i+j+S_n) \bmod L} \quad (3)$$

where N represents the number of synchronization bursts in the multiframe MF and n is a summation counter, e.g., N=4 in the example shown in FIG. 2, where K represents the number of bins in each slot, i.e., 4 in the example shown in FIG. 2, j is a summation counter from 0 to K−1, where $S_o$, $S_1$, $S_2$ and $S_3$ represent the known bin spacings ($S_n$) from the initial bin 0 in frame $F_o$ (N=4), where $S_o$=0, and $S_1$, $S_2$, and $S_3$ are preferably unevenly spaced therefrom across multiframe MF. For example, if the second synchronization sequence is in frame $F_{24}$, timeslot $A_0$, then $S_1$=768. The "mod L" operation in formula (3) assures a proper wrap-around, i.e., if the sum i+j+$S_n$ is greater than L (3,264 in ACeS), then L (or multiples thereof) is subtracted from the sum.

Accordingly, if bin i were the first bin of the first high-power synchronization burst, then some or all of subsequent bins in that timeslot, i.e., bins i+1, ... I+K−1, should also have high values of B metrics. With reference again to FIG. 2, if the selected bin i is at frame $F_0$, timeslot $A_0$, constituting the actual start of sync, then each of bins $b_o$, $b_1$, $b_2$ and $b_3$ within that timeslot would have high energy values therein.

As noted, the four synchronization bursts, e.g., in timeslot $A_o$ within frames $F_o$, $F_{24}$, $F_{50}$ and $F_{75}$, are spread apart unevenly in multiframe MF in an effort to distinguish the synchronization signals from other bursts. With a particular bin i selected as the hypothetical start of the synchronization signal and the following synchronization bursts spaced apart by known distances therefrom, the metric (M) sums all of these energies to determine if the energies contained therein are high also, indicating the selection is a good candidate for the start of the synchronization signals.

If, however, a portion of the control signal beginning at or near, for example, frame $F_{24}$, timeslot $A_4$, bin $b_o$ were incorrectly selected as bin i, then the space-profile metric ($M_i$) for that selection would most likely be low since the summations of bin energies from that beginning mark, i.e., the incorrect bin i, would most likely not fall within the known placement for the high-power synchronization bursts.

Although use of the above metric $M_i$ is a useful predictor of whether or not a given bin i has been correctly chosen, it is apparent that in some situations, e.g., with heavy control traffic or paging, mistakes can occur and the metric $M_i$ can read high and falsely predict that the hypothetical bin i is correct. Accordingly, another metric, generated pursuant to the early-late test of the present invention to corroborate the above-determination, is used to verify the correctness and improved the accuracy of the candidate selection using the formula:

$$D_i = (M_i - M_{(i-KWP \bmod L)}) + (M_i - M_{(i+KWP \bmod L)}) \quad (4)$$

where W represents the number of slots per frame. The product KWP is modded with L to account for wrap-around.

This early-late metric ($D_i$) compares the space profile metric $M_i$ for the hypothetical bin i with the same metric computed at P frames earlier, i.e., $M_{(i-KWP \bmod L)}$, and at P frames later, i.e., $M_{(i+KWP \bmod L)}$, using the same known synchronization burst spacings $S_n$. In other words, the early-late metric ($D_i$) is a further check on the hypothetical selection to ascertain if a group of high-power non-synchronization bursts mimic the correct synchronization spacing in the event the hypothetical selection is incorrect. If the space-profile metrics for the aforementioned corresponding earlier and later bins are low, then the high value of the early-late metric ($D_i$) for the hypothetical bin selection indicates that the selection of bin i as a part of the synchronization start signal is most likely correct. Conversely, if the early and late space-profile metrics are as high as that of $M_i$, then the sum of the differences in equation (4) will be low, indicating that bin i may not be a suitable candidate for synchronization start and another hypothetical bin i should be selected and the above testing performed anew.

In one embodiment of the present invention, the bit stream from the control signal is divided into a multiplicity of bin-sized portions, e.g., at least 3,264 such portions for a 102 frame multiframe and space-profile metrics ($M_i$) computed for each. After such computations, the early-late metric ($D_i$) is then readily computed for each hypothetical bin i to ascertain the space-profile metric (and bin i) having the largest value, i.e., the greatest differences.

It has been found that with the use of the $M_i$ and $D_i$ metrics, the selection of bin i as the initial synchronization bin is corroborated with a high degree of accuracy. Experiments have shown that though use of the aforedescribed early-late tests of the present invention, 99% accuracy is achieved where C/N=−10 dB with 3 seconds of synchronization time. Accordingly, synchronization is possible even in the presence of a multitude of separate other high-power bursts, such as paging, which may occur around each synchronization burst and which in combination may mimic the pattern of synchronization bursts. With the use of the above early-late testing methods of the present invention, one is better able to detect the correct initial synchronization burst with a reduced probability of false detection.

The usefulness of the early-late test metrics of the present invention in selecting a correct hypothetical bin i is illustrated in FIGS. 3 and 4. Shown in FIGS. 3A, 3B and 3C are the power level measurements over a portion of a control channel transmission signal, corresponding faded signal and corresponding received signal, respectively. Indicia 26a, 26b, 26c and 26d mark the positions within the respective signals of the high-power synchronization bursts in a respective multiframe, corresponding substantially to the multiframe MF shown in FIG. 2. The first indicia, 26a, represents an HPS burst at the multiframe boundary, i.e., frame $F_o$, timeslot $A_o$, bin 0. A portion of the previous multiframe precedes indicia 26a. The other synchronization bursts, which are preferably HPB bursts on the broadcast channel, are located at frame 24, slot 0 ($S_1$=768), indicia 26b, at frame 50, slot 0 ($S_2$=1600), indicia 26c, and at frame 75, slot 0 ($S_3$=2,400), indicia 26d.

With further reference to FIG. 3A, it is shown that immediately after the initial high-power synchronization burst, indicia 26a, there follows five lower-level power bursts, representative of normal transmission power levels of, for example, the broadcast traffic channel. The remaining transmission in the multiframe, i.e., frames 6–101, however, illustrate a scenario where heavy paging is present with the concomitant high-power paging bursts throughout. The channel is, accordingly, fully loaded. With further reference to FIGS. 3B and 3C, it is shown that the HPS bursts are buried in the background. Further, since C/N is −10 dB, as shown in FIG. 3C, the noise component dominates. In other words, the variance of the noise component is ten times that of the signal component, and the multiframe boundary is indistinguishable from the noise.

Shown in FIG. 4A is a graph of the values of $M_i$, calculated from formula (2), the space-profile metric. Indicia 26a, representing the multiframe boundary, lost in the received control signal stream in FIG. 3B is also lost in the space-profile values. As is clear from FIG. 4A, the space-profile test alone cannot locate the multiframe boundary in a noisy channel, and some additional information is required to properly ascertain the multiframe boundary. In FIG. 4B are shown the values of $D_i$ calculated from formula (3), the early-late testing metric. As is clear from FIG. 4B, the indicia 26a for the multiframe boundary is quite prominent and readily detected, indicating that the difference metric computed in accordance with the present invention is particularly useful in acquiring synchronization despite the presence of numerous other high-power bursts in the transmission stream.

Figure 5:
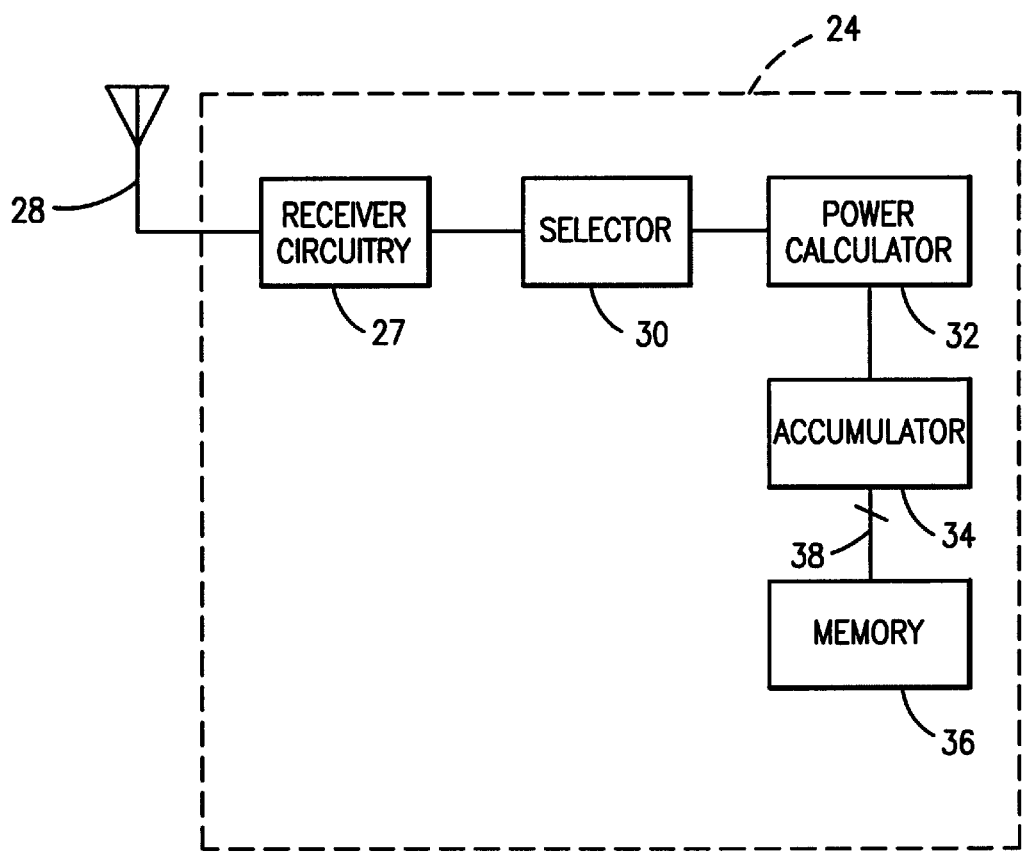
FIG. 5 illustrates a functional block diagram of a portion of a radiotelephone in accordance with an embodiment of the present invention.

With reference now to FIG. 5 of the drawings, there is shown a block diagram of a portion of the radiotelephone 24, such as a cellular phone, which receives control signals transmitted thereto, such as from the network control center 18 through transceiver 22 shown in FIG. 1. The radiotelephone 24 includes receiver circuitry 27 tunable to detect and receive signals transmitted to the radiotelephone through an antennae 28. Signals representative of the received signals are applied to a selector 30 which is operable to select portions of the in-coming received signal for analysis. In particular, selector 30 divides the control signal into consecutive portions which are individually processed, as described below. It should be understood, however, that selector 30 may focus the selection process, e.g., be more responsive to high-power bursts, in an effort to concentrate the search for the initial sync burst signifying the multiframe boundary.

The energy accumulated within the selected portions, such as the energy within a given bin, is then computed, using the nonlinear power metrics described in the aforementioned co-pending application. A power calculator 32 sums the energies accumulated within the respective bits within the bin. This energy sum may then be passed to an accumulator 34 which adds the new sum to previous sums, e.g., in calculating energies contained in disparate bins using early-late tests, e.g., the spaced-apart synchronization bursts in computing $M_i$ and the space-profile metrics at either side of the hypothetical bin i. The sum in accumulator 34 may then be compared with an amount stored in a memory 36 using a shift register 38, and the sum in accumulator 34 may be exchanged with that in memory 36 if a given condition is met, e.g., the sum in accumulator 34 is greater. Other information about the particular bin, e.g., index information, may also be stored in memory 36 to reference the particular value(s) therein.

It should be understood that the aforementioned metrics $M_i$ and $D_i$ ascertain the vicinity or neighborhood of the multiframe boundary, not necessarily the exact bit-wise location. Through use of the above metrics in coarse synchronization, a particular region, segment or portion within the transmitted bit stream is selected as a likely candidate, narrowing the selection to roughly a bin-sized area. The more cumbersome and computationally demanding fine synchronization is thereafter employed to narrow the synchronization to the bit-level.

It should, therefore, be understood that the division of the received control signal bit stream into bin-sized pieces may partition a transmitted timeslot and the bins therein across two received bin sample portions, thereby splitting the signal. The method and apparatus of the invention, however, using the aforedescribed early-late metric is nonetheless able to ascertain the multiframe boundary quickly and reliably.

It should further be understood that the aforementioned bin metrics (B) may be computed with a greater degree of accuracy using the nonlinear techniques set forth in the present applicant's co-pending application.

It should additionally be understood that although the synchronization burst pattern transmitted within each multiframe may consist of all high-power synchronization bursts, other high-power bursts, such as from the broadcast channel, may function as synchronization bursts. The reason for this is that the energy accumulation technique employed in the present invention does not discern the source of the energy, merely its presence. Thus, the broadcast channels, which typically transmit at a normal power level, as shown in FIGS. 3A and 3B, when broadcasting at full power, act as a synchronization burst.

It should finally be understood that other similar methods for computing the energies within the synchronization bins and profiling the energy measurements, such as in the co-pending patent application, are intended to be within the scope of the present invention. Furthermore, it should be understood that other difference metrics may be employed for analysis than the particular one recounted herein.

The previous description is of a preferred embodiment for implementing the invention, and the scope of the invention

13 should not necessarily be limited by this description. The scope of the present invention is instead defined by the following claims.

What is claimed is:

1. A method for coarse synchronization of a receiver with a transmitter using an early-late test, the receiver and the transmitter coupled together by way of a communication channel, said method comprising the steps of:

transmitting, from the transmitter, a control signal upon the communication channel, the control signal being divided into a succession of consecutive multiframes, each of said multiframes comprising a multiplicity of discrete frames therein, and each of said multiframes comprising at least one high-power synchronization signal therein;

detecting, at the receiver, the control signal transmitting during said step of transmitting;

selecting at least one given portion of the detected control signal, said selection of said at least one given portion by said receiver being a coarse selection of the transmitted control signal independent of the boundaries of the multiframes; calculating the energy accumulated within said at least one given portion;

selecting at least one previous portion and at least one later portion of said detected control signal, said at least one previous and later portions being respectively displaced prior to and subsequent from said at least one given portion within said detected control signal;

calculating the energies accumulated with said at least one previous and later portions; and comparing the energy accumulated within said at least one given portion with that of both said at least one previous and said at least one later portions, respectively, whereby said comparison is used to determine a multiframe boundary, thereby coarsely synchronizing said receiver with the transmitter and the control signal transmitted therefrom.

2. The method according to claim 1, wherein the step of comparing comprises:

computing a difference metric by adding the difference between the energy within said at least one given portion and the energy within said at least one previous portion, and the difference between the energy within said at least one given portion and the energy within said at least one later portion, whereby said difference metric is used to determine said multiframe boundary.

3. The method according to claim 1, wherein said detected control signal is divided into a multiplicity of discrete consecutive bins, bin i being selected as a multiframe boundary, said respective portions each comprising at least one bin, the beginning of said given portion comprising bin i, and wherein said step of calculating calculates a space-profile metric of at least one of said bins in accordance with the formula:

$$M_i = \sum_{n=0}^{N} \sum_{j=0}^{K-1} B_{(i+j+S_n) \bmod L}$$

where B represents the accumulated energy within a particular bin, K represents the number of bins within a timeslot, N represents the number of discrete synchronization signals within each of said multiframes, j and n are summation counters, L represents the number of bins within said multiframes, $S_n$ represents the respective spacings of the N synchronization signals within said multiframes, said N synchronization signals being unevenly spaced within

14 said multiframe and forming a synchronization pattern therein, and $M_i$ represents the accumulations of energies of all bins within said synchronization pattern.

4. The method according to claim 3, wherein N ranges from 3 to 8.

5. The method according to claim 4, wherein N=4.

6. The method according to claim 3, wherein K=4.

7. The method according to claim 3, wherein $S_o=0$, and $S_1$ to $S_n$ are unevenly spaced from S0 within said multiframe.

8. The method according to claim 3, wherein said step of calculating calculates the energy accumulated within said at least one previous and at least one later portions in accordance with the respective formulas:

$$M_{(i-KWP \bmod L)} \text{ and } M_{(i+KWP \bmod L)}$$

where W represents the number of timeslots per frame of said multiframe, $M_{(i-KWP \bmod L)}$ represents the energy accumulated within said at least one previous portion taken P frames earlier than $M_i$, and $M_{(i+KWP \bmod L)}$ represents the energy accumulated within said at least one later portion taken P frames later than $M_i$; and wherein said step of comparing energy using said early-late test utilizes the formula:

$$D_i = (M_i - M_{(i-KWP \bmod L)}) + (M_i - M_{(i+KWP \bmod L)})$$

where $D_i$ represents an early-late difference metric with bin i as the multiframe boundary selection, whereby upon computing a series of difference metrics with a multiplicity of other bins within said multiframe each selected as the multiframe boundary, and the bin corresponding to the maximum difference metric being chosen.

9. The method according to claim 3, wherein an energy metric for a given bin ($B_l$) within a timeslot is computed utilizing the formula:

$$B_l = \sum_{i=x}^{y} |r_i|^2$$

where $r_i$ represents a received signal sample, and $B_l$ represents the accumulated energy of said given bin within the respective bits therein from x to y.

10. The method according to claim 3, wherein an energy metric for a given bin ($B_l$) within a timeslot is computed utilizing the formula:

$$B_l = \int_x^y |r(t)|^2 dt$$

where the integration is over the time interval of bin l from bit x to bit y therein, and r is a function for a received signal sample over time over said interval.

11. In a communication system having a first communication station and a second communication station, the first and second communication stations, respectively, coupled together by way of a communication channel, a combination with the first and second communication stations of circuitry for synchronizing the second communication station with the first communication station using an early-late test, said circuitry comprising:

a control signal generator positioned at the first communication station, said control signal generator for generating and transmitting a control signal upon the communication channel, the transmitted control signal being divided into a succession of consecutive multiframes, each of said multiframes comprising a multiplicity of discrete frames therein, and each of said multiframes comprising at least one high-power synchronization signal therein;

a control signal detector positioned at the second communication station, said control signal detector for detecting the control signal generated and transmitted by said control signal generator;

a selector coupled to said detector, said selector for selecting at least one given portion of the detected control signal, said selection of said at least one given portion by said selector being a coarse selection of the transmitted control signal independent of the boundaries of the multiframes;

a calculating means for accumulating the energy accumulated within said at least one given portion, and for accumulating the energy within at least one previous portion and at least one later portion of said detected control signal, respectively displaced prior to and subsequent from said at least one given portion; and a comparator for comparing the energy accumulated within said at least one given portion with that of said at least one previous and said at least one later portions, respectively, said comparator being used to determine a multiframe boundary, thereby coarsely synchronizing said second communication station with the first communication station and the control signal transmitted therefrom.

12. The communication system according to claim 11, wherein said calculating means computes a difference metric by adding the difference between the energy within said at least one given portion and the energy within said at least one previous portion, and the difference between the energy within said at least one given portion and the energy within said at least one later portion, whereby said difference metric is used to determine said multiframe boundary.

13. The communication system according to claim 11, wherein said detected control signal is divided into a multiplicity of discrete consecutive bins, bin i being selected as a multiframe boundary, said respective portions each comprising at least one bin, the beginning of said given portion comprising bin i, and wherein said calculating means computes a space-profile metric of at least one of said bins in accordance with the formula:

$$M_i = \sum_{n=0}^{N-1} \sum_{j=0}^{K-1} B_{(i+j+S_n) \bmod L}$$

where B represents the accumulated energy within a particular bin, K represents the number of bins within a timeslot, N represents the number of discrete synchronization signals within each of said multiframes, j and n are summation counters, L represents the number of bins within said multiframes, $S_n$ represents the respective spacings of the N synchronization signals within said multiframes, said N synchronization signals being unevenly spaced within said multiframe and forming a synchronization pattern therein, and $M_i$ represents the accumulations of energies of all bins within said synchronization pattern.

14. The communication system according to claim 13, wherein N ranges from 3 to 8.

15. The communication system according to claim 14, wherein N=4.

16. The communication system according to claim 13, wherein K=4.

17. The communication system according to claim 13, wherein $S_0=0$ and $S_l$ to $S_n$ are unevenly spaced from $S_0$ within said multiframe.

18. The communication system according to claim 13, wherein said calculating means computes the space-profile metrics for said at least one previous and at least one later portions in accordance with the respective formulas:

$$M_{(i-KWP \bmod L)} \text{ and } M_{(i+KWP \bmod L)}$$

where W represents the number of timeslots per frame of said multiframe, $M_{(i-KWP \bmod L)}$ represents the energy accumulated within said at least one previous portion taken P frames earlier than $M_i$, and $M_{(i+KWP \bmod L)}$ represents the energy accumulated within said at least one later portion taken P frames later than $M_i$; and computes an early-late test for said given portion with bin i therein in accordance with the formula:

$$D_i = (M_i - M_{(i-KWP \bmod L)}) + (M_{(i-KWP \bmod L)})$$

where $D_i$ represents the early-late difference metric with bin i as the multiframe boundary selection, whereby upon computing a series of difference metrics with a multiplicity of other bins within said multiframe each selected as the multiframe boundary, and the bin corresponding to the maximum difference metric being chosen.

19. The communication system according to claim 13, wherein said calculating means computes the energy within said particular bin in accordance with the formula:

$$B_l = \sum_{i=x}^{y} |r_i|^2$$

where $r_i$ represents a received signal sample, and $B_l$ represents the accumulated energy of said particular bin within the respective bits therein from x to y.

20. The communication system according to claim 13, wherein said calculating means computes the bin energy metric in accordance with the formula:

$$B_l = \int_x^y |r(t)|^2 dt$$

where the integration is over the time interval of bin l from bit x to bit y therein, and r is a function for the received signal sample over time over said interval.

21. A receiver synchronizable with a transmitter, said receiver comprising:

a control signal detector for detecting transmission of a control signal thereto, the control signal transmitted by the transmitter, the transmitted control signal being divided into a succession of consecutive multiframes, each of said multiframes comprising a multiplicity of discrete frames therein, and each of said multiframes comprising at least one high-power synchronization signal therein;

a selector coupled to said detector, said selector for selecting at least one given portion of the detected control signal, said selection of said at least one given portion by said selector being a coarse selection of the transmitted control signal independent of the boundaries of the multiframes;

a calculating means for measuring and accumulating the energy accumulated within said at least one given portion, and for accumulating the energy within at least one previous portion and at least one later portion of said detected control signal, respectively displaced prior to and subsequent from said at least one given portion; and a comparator for comparing the energy accumulated within said at least one given portion with that of said at least one previous and said at least one later portions, respectively, said comparator being used to determine a multiframe boundary, thereby coarsely synchronizing said second communication station with the first communication station and the control signal transmitted therefrom.

22. The receiver according to claim 21, wherein said calculating means computes a difference metric by adding the difference between the energy within said at least one given portion and the energy within said at least one previous portion, and the difference between the energy within said at least one given portion and the energy within said at least one later portion, whereby said difference metric is used to determine said multiframe boundary.

23. The receiver according to claim 21, wherein said detected control signal is divided into a multiplicity of discrete consecutive bins, bin i being selected as a multiframe boundary, said respective portions each comprising at least one bin, the beginning of said given portion comprising bin i, and wherein said calculating means computes a space-profile metric of at least one of said bins in accordance with the formula:

$$M_i = \sum_{n=0}^{N} \sum_{j=0}^{K-1} B_{(i+j+S_n) \bmod L}$$

where B represents the accumulated energy within a particular bin, K represents the number of bins within a timeslot, N represents the number of discrete synchronization signals within each of said multiframes, j and n are summation counters, L represents the number of bins within said multiframes, $S_n$ represents the respective spacings of the N synchronization signals within said multiframes, said N synchronization signals being unevenly spaced within said multiframe and forming a synchronization pattern therein, and $M_i$ represents the accumulations of energies of all bins within said synchronization pattern.

24. The communication system according to claim 23, wherein N ranges from 3 to 8.

25. The communication system according to claim 24, wherein N=4.

26. The communication system according to claim 23, wherein K=4.

27. The communication system according to claim 23, wherein $S_0=0$ and $S_1$ to $S_n$ are unevenly spaced from $S_0$ within said multiframe.

28. The receiver according to claim 23, wherein said step of calculating calculates the energy accumulated within said at least one previous and at least one later portions in accordance with the formulas:

$$M_{(i-KWP \bmod L)} \text{ and } M_{(i+KWP \bmod L)}$$

where W represents the number of timeslots per frame of said multiframe, $M_{(i-KWP \bmod L)}$ represents the energy accumulated within said at least one previous portion taken P frames earlier than $M_i$, and $M_{(i+KWP \bmod L)}$ represents the energy accumulated within said at least one later portion taken P frames later than $M_i$; and wherein said step of comparing energy using said early-late test utilizes the formula:

$$D_i = (M_i - M_{(i-KWP \bmod L)}) + (M_i - M_{i+KWP \bmod L})$$

where $D_i$ represents an early-late difference metric with bin i as the multiframe boundary selection, whereby upon computing a series of difference metrics with a multiplicity of other bins within said multiframe selected as the multiframe boundary, and the bin corresponding to the maximum difference metric being chosen.

29. The receiver according to claim 23, wherein an energy metric for a given bin ($B_l$) within a timeslot is computed utilizing the formula:

$$B_l = \sum_{i=x}^{y} |r_i|^2$$

where $r_i$ represents a received signal sample, and $B_l$ represents the accumulated energy within the respective bits therein from x to y.

30. The receiver according to claim 23, wherein an energy metric for a given bin ($B_l$) within a timeslot is computed utilizing the formula:

$$B_l = \int_x^y |r(t)|^2 dt$$

where the integration is over the time interval of bin l from bit x to bit y therein, and r is a function for a received signal sample over time over said interval.

* * * * *

UNITED STATES PATENT AND TRADEMARK OFFICE
CERTIFICATE OF CORRECTION

PATENT NO. : 5,805,646
DATED : Sep. 8, 1998
INVENTOR(S) : Wang

It is certified that error appears in the above-identified patent and that said Letters Patent is hereby corrected as shown below:

Column 14, line 9     Replace "SO"
                      With --$S_0$--

Column 18, line 16    Replace "$(M_i-M_{i-KWPmodL})$"
                      With --$(M_i-M_{(i+KWPmodL)})$--

Signed and Sealed this

Twenty-second Day of June, 1999

Q. TODD DICKINSON

*Attest:*

*Attesting Officer*     Acting Commissioner of Patents and Trademarks